(12) United States Patent
Mase et al.

(10) Patent No.: US 8,846,810 B2
(45) Date of Patent: Sep. 30, 2014

(54) POLYMER PARTICLE AND METHOD FOR PRODUCING THE SAME

(75) Inventors: Nobuyuki Mase, Shizuoka (JP); Takeshi Sako, Shizuoka (JP); Idzumi Okajima, Shizuoka (JP); Shunsuke Mori, Shizuoka (JP); Keishi Mizuno, Shizuoka (JP); Yoshitaka Yamauchi, Shizuoka (JP); Taichi Nemoto, Shizuoka (JP); Chiaki Tanaka, Shizuoka (JP); Satoyuki Sekiguchi, Kanagawa (JP); Jyun Ishiduka, Shizuoka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/040,886

(22) Filed: Mar. 4, 2011

(65) Prior Publication Data

US 2011/0218313 A1 Sep. 8, 2011

(30) Foreign Application Priority Data

Mar. 8, 2010 (JP) ................................ 2010-049992
Mar. 8, 2010 (JP) ................................ 2010-050985
Aug. 5, 2010 (JP) ................................ 2010-176518

(51) Int. Cl.
  *C08G 63/08* (2006.01)
(52) U.S. Cl.
  USPC ................. 524/878; 516/9; 516/30; 516/920; 528/354; 528/355
(58) Field of Classification Search
  None
  See application file for complete search history.

(56) References Cited

U.S. PATENT DOCUMENTS

| | | | |
|---|---|---|---|
| 5,312,882 | A | 5/1994 | DeSimone et al. |
| 7,354,690 | B2 | 4/2008 | Ishii et al. |
| 7,390,607 | B2 | 6/2008 | Tanaka et al. |
| 7,396,625 | B2 | 7/2008 | Tanaka et al. |
| 7,396,627 | B2 | 7/2008 | Watanabe et al. |
| 7,432,032 | B2 | 10/2008 | Tanaka et al. |
| 7,575,842 | B2 | 8/2009 | Ishii et al. |
| 2004/0072985 | A1 | 4/2004 | Lee et al. |
| 2004/0106720 | A1* | 6/2004 | Jerome et al. ................. 524/445 |
| 2005/0277045 | A1 | 12/2005 | Saito et al. |
| 2007/0202427 | A1 | 8/2007 | Tanaka |
| 2009/0124789 | A1 | 5/2009 | Yoshida et al. |
| 2009/0162770 | A1 | 6/2009 | Sako et al. |
| 2012/0035341 | A1* | 2/2012 | Diehl et al. .................... 528/223 |

FOREIGN PATENT DOCUMENTS

| | | | |
|---|---|---|---|
| JP | 9-503798 A | | 4/1997 |
| JP | 2004-277698 A | * | 10/2004 |
| JP | 2007-47752 | | 2/2007 |
| JP | 2008-163073 A | * | 7/2008 |
| JP | 2008-239935 A | | 10/2008 |
| JP | 2009-132878 | | 6/2009 |
| JP | 2009-167409 | | 7/2009 |
| JP | 2011-26482 A | | 2/2011 |
| WO | WO 2010/100390 | * | 9/2010 |

OTHER PUBLICATIONS

Entitled "Ring-opening Polymerization of L-lactide in Supercritical Carbon Dioxide using PDMS-based Stabilizers" authored by Ganapathy et al. and published in European Polymer Journal (2007) 43, 119-126.*
Kinetics and Mechanism of Cyclic Esters Polymerization Initiated with Tin(II) Octoate. 3. Polymerization of L,L-Dilactide: authored by Kowalski et al. and published in Macromolecules (2000) 33, 7359-7370.*
"Polymerization of Lactides and Lactones by Metal-Free Initiators" authored by Li et al. and published in Industrial and Engineering Chemical Research (2005) 44, 8641-8643.*
"Organocatalytic Ring Opening Polymerization" authored by Kamber et al. and published in Chem. Rev. (2007) 107, 5813-5840.*
Machine-generated translation of JP 2008-163073 into English (Jul. 2008).*
"Effective Guanidine-Catalyzed Synthesis of Carbonate and Carbamate Derivatives from Propargyl Alcohols in Supercritical Carbon Dioxide" authored by Ca et al. and published in Advanced Synthesis and Catalysis (2011) 353(1), 133-146.*
Abstract for the article entitled "Controlled Polymerization of Lactide using an Organo-catalyst in Supercritical Carbon Dioxide" authored by Blakey et al., and published in Green Chemistry (2011) 13 (8), 2032-2037.*
Office Action issued Oct. 15, 2013, in Japanese Patent Application No. 2010-049992.
Office Action issued Oct. 22, 2013, in Japanese Patent Application No. 2010-176518.

* cited by examiner

*Primary Examiner* — Marc Zimmer
(74) *Attorney, Agent, or Firm* — Oblon, Spivak, McClelland, Maier & Neustadt, L.L.P.

(57) ABSTRACT

A method for producing polymer particles, including (A) polymerizing and granulating a ring-opening polymerizable monomer in a compressive fluid with a catalyst in the presence of a surfactant, or (B) polymerizing and granulating an addition polymerizable monomer in a compressive fluid in the presence of a silicone surfactant.

11 Claims, 3 Drawing Sheets

POLYMER PARTICLE AND METHOD FOR PRODUCING THE SAME

BACKGROUND OF THE INVENTION

1. Field of the Invention

The present invention relates to a method for producing polymer particles in a compressive fluid through heterogeneous polymerization of a ring-opening polymerizable monomer or through polymerization of an addition polymerizable monomer; and to polymer particles obtained by the method.

2. Description of the Related Art

Well known are methods of producing fine polymer particles through heterogeneous polymerization of a monomer in supercritical carbon dioxide, including emulsion polymerization, dispersion polymerization and suspension polymerization.

Heterogeneous polymerization in supercritical carbon dioxide has the following advantages over heterogeneous polymerization in water or organic solvents, and thus is utilized as a method for producing fine polymer particles from various monomers. The obtained polymer particles are used for various applications such as electrophotographic developers, printing inks, building paints and cosmetics. Specifically, the advantages are as follows.
(1) Solvent removal and drying after polymerization can be simplified.
(2) Treatment of waste solvent can be omitted.
(3) Highly toxic organic solvent is not needed.
(4) Residual unreacted monomer components and hazardous materials can be removed at a washing step.
(5) Used carbon dioxide can be recovered and recycled.

For example, Japanese Patent Application Laid-Open (JP-A) No. 2009-167409 discloses a method of synthesizing colored polymer particles from a radical polymerizable monomer in the presence of a surfactant containing a perfluoroalkyl group. However, the fluorine-containing surfactant used in this method is very expensive and also is problematic in terms of safety. Further, this method cannot produce polymer particles having a small molecular weight distribution (Mw/Mn) (about 2 or smaller) attained by the present invention.

JP-A No. 2009-132878 discloses a method of producing polymer particles using a polymer radical polymerization initiator containing an organosiloxane skeleton, while synthesizing a polymer surfactant in one pot without separately synthesizing and preparing surfactants suitable for monomers. However, this method also cannot produce polymer particles having a molecular weight distribution (Mw/Mn) of 2 or less. Further, there is no description about ring-opening polymerizable monomers.

As described above, no reports have been presented on a method for producing polymer particles having a small molecular weight distribution with an inexpensive, highly safe means using a ring-opening polymerizable monomer or an addition polymerizable monomer in a compressive fluid such as a supercritical fluid.

BRIEF SUMMARY OF THE INVENTION

The present invention aims to provide a method for efficiently producing polymer particles with narrow molecular weight distribution from a ring-opening polymerizable monomer in a compressive fluid in the presence of a surfactant, and polymer particles obtained by this method.

Also, the present invention aims to provide a method for efficiently producing polymer particles with narrow molecular weight distribution from an addition polymerizable monomer in a compressive fluid in the presence of a silicone surfactant, and polymer particles obtained by this method.

Means for solving the above existing problems are as follows.

<1> A method for producing polymer particles, including:

(A) polymerizing a ring-opening polymerizable monomer to produce a polymer while granulating the polymer in a compressive fluid with a catalyst in the presence of a surfactant, or (B) polymerizing an addition polymerizable monomer to produce a polymer while granulating the polymer in a compressive fluid in the presence of a silicone surfactant.

<2> The method according to <1>, wherein the catalyst is an organic catalyst.

<3> The method according to <2>, wherein the organic catalyst is a nucleophilic nitrogen compound having basicity.

<4> The method according to <2>, wherein the organic catalyst is a cyclic compound containing a nitrogen atom.

<5> The method according to <2>, wherein the organic catalyst is at least one selected from the group consisting of a cyclic amine compound, a cyclic diamine compound, a cyclic triamine compound having a guanidine skeleton, a heterocyclic aromatic organic compound containing a nitrogen atom and N-heterocyclic carbene.

<6> The method according to <5>, wherein the organic catalyst is any one selected from the group consisting of 1,4-diazabicyclo-[2.2.2]octane, 1,8-diazabicyclo[5.4.0]undec-7-ene, 1,5,7-triazabicyclo[4.4.0]dec-5-ene, diphenylguanidine, N,N-dimethyl-4-aminopyridine, 4-pyrrolidinopyridine and 1,3-di-tert-butylimidazol-2-ylidene.

<7> The method according to <1>, wherein the ring-opening polymerizable monomer is a lactide of L-form lactic acids, a lactide of D-form lactic acids, or a lactide of an L-form lactic acid and a D-form lactic acid.

<8> The method according to <1>, wherein the surfactant used in (A) has compatibility to both the compressive fluid and the ring-opening polymerizable monomer.

<9> The method according to <1>, wherein the surfactant used in (A) contains any one selected from the group consisting of a perfluoroalkyl group, a polydimethylsiloxane group and a polyacrylate group.

<10> The method according to <1>, wherein the silicone surfactant used in (B) is a surfactant represented by General Formula (1), (2) or (3) below:

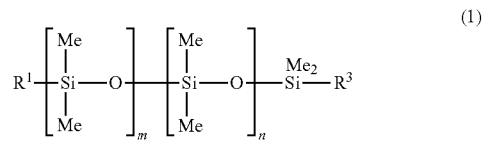

where Me denotes a methyl group; one or two among $R^1$, $R^2$ and $R^3$ each represent a residue containing a C6-C30 long-chain alkyl group and the other or the others each represent a residue containing a C1-C4 lower alkyl group; and each of m and n is an integer of 1 or greater indicating a number of repeating units,

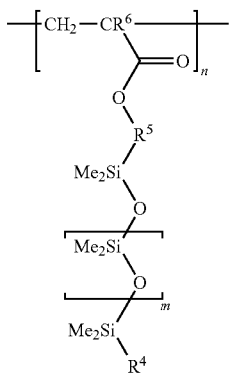

(2)

where Me denotes a methyl group, $R^4$ and $R^6$ each represent a hydrogen atom or a methyl group, $R^5$ represents a methylene group or an ethylene group, and each of m and n is an integer of 1 or greater indicating a number of repeating units,

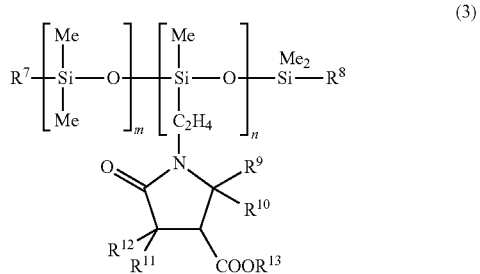

(3)

where at least one of $R^7$ and $R^8$ represents a residue containing a C6-C30 long-chain alkyl group and the other represents a redisue containing a C1-C4 lower alkyl group; $R^9$ to $R^{13}$ each represent a hydrogen atom or a C1-C4 lower alkyl group; and each of m and n is an integer of 1 or greater indicating a number of repeating units.

<11> The method according to <1>, wherein the compressive fluid is formed of carbon dioxide.

<12> Polymer particles obtained by a method including:

(A) polymerizing a ring-opening polymerizable monomer to produce a polymer while granulating the polymer in a compressive fluid with a catalyst in the presence of a surfactant, or (B) polymerizing an addition polymerizable monomer to produce a polymer while granulating the polymer in a compressive fluid in the presence of a silicone surfactant.

<13> The polymer particles according to <12>, wherein the polymer particles have a molecular weight distribution Mw/Mn of 2.0 or less, where Mw denotes a weight average molecular weight of the polymer particles and Mn denotes a number average molecular weight of the polymer particles.

The present invention can provide a method for efficiently producing polymer particles with narrow molecular weight distribution from a ring-opening polymerizable monomer in a compressive fluid in the presence of a surfactant, and polymer particles obtained by this method.

Also, the present invention can provide a method for efficiently producing polymer particles with narrow molecular weight distribution from an addition polymerizable monomer in a compressive fluid in the presence of a silicone surfactant, and polymer particles obtained by this method.

DETAILED DESCRIPTION OF THE INVENTION

In a first embodiment, the present invention has a technical feature of polymerizing a ring-opening polymerizable monomer simultaneously with granulating the resultant polymer (particle formation) in a compressive fluid. The present invention first discloses the granulation of polymers using the ring-opening polymerizable monomer in the compressive fluid.

In a second embodiment, the present invention has a technical feature of polymerizing an addition polymerizable monomer simultaneously with granulating the resultant polymer (particle formation) in a compressive fluid. In addition, the present invention has another technical feature that a silicone surfactant used is inexpensive and highly safe and the produced polymer particles have a narrow molecular weight distribution.

Figure 1:
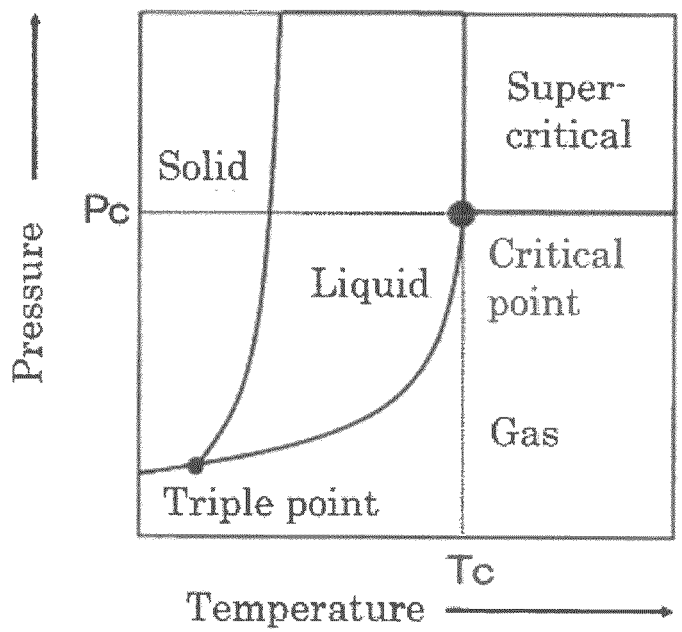
FIG. 1 is a general phase diagram showing the state of a substance varying depending on pressure and temperature conditions.
Figure 2:
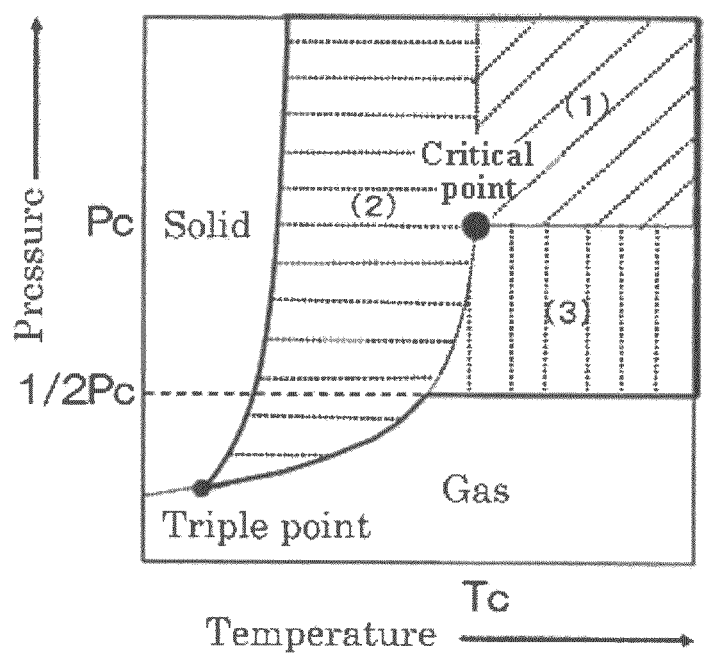
FIG. 2 is a phase diagram which defines a compressive fluid used in the present invention.

In the present invention, the "compressive fluid" refers to a substance present in any one of the regions (1), (2) and (3) of FIG. 2 in the phase diagram of FIG. 1. In FIGS. 1 and 2, Pc and Tc denote a critical pressure and a critical temperature, respectively.

In such regions, the substance is known to have extremely high density and show different behaviors from those shown at normal temperature and normal pressure. Notably, the substance present in the region (1) is a supercritical fluid. The supercritical fluid is a fluid that exists as a noncondensable high-density fluid at a temperature and a pressure exceeding the corresponding critical points, which are limiting points at which a gas and a liquid can coexist. Also, the supercritical fluid does not condense even when compressed, and exists at a critical temperature or higher and a critical pressure or higher. Also, the substance present in the region (2) is a liquid, but in the present invention, is a liquefied gas obtained by compressing a substance existing as a gas at normal temperature (25° C.) and normal pressure (1 atm). Further, the substance present in the region (3) is a gas, but in the present invention, is a high-pressure gas whose pressure is ½ Pc or higher.

Examples of the substance usable as the compressive fluid include carbon monoxide, carbon dioxide, dinitrogen monoxide, nitrogen, methane, ethane, propane, 2,3-dimethylbutane and ethylene. These may be used alone or in combination.

Among them, carbon dioxide is preferred, since its critical pressure and temperature are about 7.4 MPa and about 31° C., it can be easily brought into a critical state, and it is nonflammable to allow easy handling.

Also, when carbon dioxide is used as the compressive fluid, the temperature is preferably 25° C. or higher and the pressure is preferably 5 MPa or higher, considering the reaction efficiency, etc. More preferably, supercritical carbon dioxide is used.

The pressure upon polymerization; i.e., the pressure of the compressive fluid, is preferably a pressure at which the compressive fluid is brought into a supercritical state, in order to increase dissovability of the monomer into the compressive fluid and make the polymerization reaction to proceed uniformly and quantitatively, although the compressive fluid may be high-pressure gas or liquefied gas. When carbon dioxide is used as the compressive fluid, the pressure must be 3.7 MPa or higher, preferably 5 MPa or higher, more preferably 7.4 MPa (critical pressure) or higher.

<Ring-Opening Polymerizable Monomer>

The ring-opening polymerizable monomer which can be polymerized in the present invention is not particularly limited so long as it contains an ester bond in the ring. Examples thereof include cyclic esters and cyclic carbonates.

The cyclic esters are not particularly limited and may be those known in the art. Particularly preferred monomers are, for example, cyclic dimers obtained by dehydration-condensating L-form compounds with each other, D-form compounds with each other, or an L-form compound with a D-form compound, each of the compounds being represented by General Formula α: R—C*—H(—OH)(COOH) where R represents a C1-C10 alkyl group.

Specific examples of the compound represented by General Formula α include enantiomers of lactic acid, enantiomers of 2-hydroxybutanoic acid, enantiomers of 2-hydroxypentanoic acid, enantiomers of 2-hydroxyhexanoic acid, enantiomers of 2-hydroxyheptanoic acid, enantiomers of 2-hydroxyoctanoic acid, enantiomers of 2-hydroxynonanoic acid, enantiomers of 2-hydroxydecanoic acid, enantiomers of 2-hydroxyundecanoic acid, and enantiomers of 2-hydroxydodecanoic acid. Of these, enantiomers of lactic acid are particularly preferred since they have high reactivity and are easily available. The cyclic dimers may be used alone or in combination.

The other cyclic esters than those represented by General Formula α include aliphatic lactones such as β-propiolactone, β-butyrolactone, γ-butyrolactone, γ-hexanolactone, γ-octanolactone, δ-valerolactone, δ-hexanolactone, δ-octanolactone, ε-caprolactone, δ-dodecanolactone, α-methyl-γ-butyrolactone, β-methyl-δ-valerolactone, glycolide and lactide. Of these, ε-caprolactone is particularly preferred since it has high reactivity and is easily available.

Also, non-limiting examples of the cyclic carbonates include ethylene carbonate and propylene carbonate.

The ring-opening polymerizable monomers may be used alone or in combination. The obtained polymer preferably has a glass transition temperature equal to or higher than room temperature. When the glass transition temperature is too low, the polymer cannot be recovered as particles in some cases.

In polymerizing the ring-opening polymerizable monomer, any of a metal catalyst and a metal-free organic catalyst can be used. Considering the influence on the environment, an organic catalyst is preferably used. The organic catalyst may be any catalysts so long as they act on ring-opening reaction of the ring-opening polymerizable monomer to form an active intermediate together with the ring-opening polymerizable monomer and then are removed (regenerated) through reaction with an alcohol. The polymerization reaction proceeds even using a cationic catalyst. However, the cationic catalyst pulls hydrogen atoms out from the polymer backbone (backbiting). As a result, the produced polymer has a broad molecular weight distribution and also, high-molecular-weight polymers are difficult to obtain. Thus, preferred are compounds having basicity and serving as a nucleophilic agent. More preferred are cyclic compounds containing a nitrogen atom. Examples of the compounds include cyclic amines, cyclic diamines (cyclic diamine compounds having an amidine skeleton), cyclic triamine compounds having a guanidine skeleton, heterocyclic aromatic organic compounds containing a nitrogen atom and N-heterocyclic carbenes.

Examples of the cyclic amine include quinuclidine. The cyclic diamine is not particularly limited and may be appropriately selected depending on the intended purpose. Examples of the cyclic diamine include 1,4-diazabicyclo-[2.2.2]octane or DABCO and 1,5-diazabicyclo(4,3,0)non-ene-5. Examples of the cyclic diamine compound having an amidine skeleton include 1,8-diazabicyclo[5.4.0]undec-7-ene or DBU and diazabicyclononene. Examples of the cyclic triamine compound having a guanidine skeleton include 1,5,7-triazabicyclo[4.4.0]dec-5-ene or TBD and diphenylguanidine or DPG. Examples of the heterocyclic aromatic organic compound containing a nitrogen atom include N,N-dimethyl-4-aminopyridine or DMAP, 4-pyrrolidinopyridine or PPY, pyrrocolin, imidazole, pyrimidine and purine. Examples of the N-heterocyclic carbene include 1,3-di-tert-butylimidazol-2-ylidene or ITBU. Of these, DABCO, DBU, DPG, TBD, DMAP, PPY and ITBU are particularly preferred.

The type and the amount of the organic catalyst used cannot flatly be determined since they vary depending on combinations of the compressive fluid and the ring-opening polymerizable monomer. However, the amount of the organic catalyst is preferably 0.01 mol % to 15 mol %, more preferably 0.1 mol % to 1 mol %, still more preferably 0.3 mol % to 0.5 mol %, relative to 100 mol % of the ring-opening polymerizable monomer. When the amount of the organic catalyst used is less than 0.01 mol %, the organic catalyst is deactivated before completion of the polymerization reaction, and as a result a polymer having a target molecular weight cannot be obtained in some cases. Whereas when the amount of the organic catalyst used is more than 15 mol %, it may be difficult to control the polymerization reaction.

Also, the polymerization reaction temperature cannot flatly be determined since it varies depending on, for example, combinations of the compressive fluid, the ring-opening polymerizable monomer and the organic catalyst. In general, the polymerization reaction temperature is preferably 40° C. to 150° C., more preferably 50° C. to 120° C., still more preferably 60° C. to 100° C. When the polymerization reaction temperature is lower than 40° C., the reaction rate easily decreases, and as a result the polymerization reaction cannot be made to proceed quantitatively in some cases. Whereas when the polymerization reaction temperature exceeds 150° C., depolymerization reaction proceeds in parallel, and as a result the polymerization reaction cannot be made to proceed quantitatively in some cases.

The polymerization reaction time is appropriately determined considering the target number average molecular weight of the polymer. When the number average molecular weight is in the range of 3,000 to 100,000, the polymerization reaction time is generally 2 hours to 12 hours.

Also, in order for the polymerization reaction to proceed uniformly and quantitatively, the difference in density between the monomers and the polymer particles is compensated through stirring so that the polymer particles do not sediment.

The pressure upon polymerization; i.e., the pressure of the compressive fluid, is preferably a pressure at which the compressive fluid is brought into a supercritical state in order to increase dissovability of the monomer into the compressive fluid and make the polymerization reaction to proceed uniformly and quantitatively, although the compressive fluid may be high-pressure gas or liquefied gas. When carbon dioxide is used as the compressive fluid, the pressure is preferably 3.7 MPa or higher, more preferably 7.4 MPa or higher.

Upon polymerization, a ring-opening polymerization initiator is preferably added to the reaction system in order to control the molecular weight of the obtained polymer. The ring-opening polymerization initiator is not particularly limited and may be those known in the art such as alcohols. The alcohols may be, for example, any of saturated or unsaturated, aliphatic mono-, di- or polyalcohols. Specific examples thereof include monoalcohols such as methanol, ethanol, propanol, butanol, pentanol, hexanol, heptanol, nonanol, decanol, lauryl alcohol, myristyl alcohol, cetyl alcohol and stearyl alcohol; dialcohols such as ethylene glycol, 1,2-propanediol, 1,3-propanediol, 1,3-butanediol, 1,4-butanediol, hexanediol, nonanediol, tetramethylene glycol and polyethylene glycol; polyalcohols such as glycerol, sorbitol, xylitol, ribitol, erythritol and triethanolamine; and methyl lactate and ethyl lactate. Also, use of a polymer containing an alcohol residue at the end enables synthesis of diblock copolymers and triblock compolymers.

The amount of the ring-opening polymerization initiator used may be appropriately adjusted considering the target molecular weight of the polymer. Preferably, the amount of the ring-opening polymerization initiator is about 0.1 parts by mass to about 5 parts by mass relative to 100 parts by mass of the ring-opening polymerizable monomer.

If necessary, a polymerization terminator (e.g., benzoic acid, hydrochloric acid, phosphoric acid, metaphosphoric acid, acetic acid and lactic acid) may be used after completion of polymerization reaction.

In the present invention, the polymerization system contains a surfactant that dissolves in the compressive fluid and has compatibility to both the compressive fluid and the ring-opening polymerizable monomer. For example, when supercritical carbon dioxide is used as the compressive fluid, the surfactant having a $CO_2$-philic group and a monomer-philic group in the molecule is used. Examples of the $CO_2$-philic group include a perfluoroalkyl group, a polydimethylsiloxane group, an ether group and a carbonyl group. The monomer-philic group may be selected in consideration of the type of the monomer used. For example, when the monomer used is a lactide or lactone, preferred are surfactants having a carbonyl group in the form of, for example, an ester bond and an amide bond.

When the surfactant is incorporated into the polymerization system, the surfactant may be added to the compressive fluid or the ring-opening polymerizable monomer.

Specific examples of the surfactant include those containing, as a partial structure, a structure represented by any one of General Formulas (1a) to (7a):

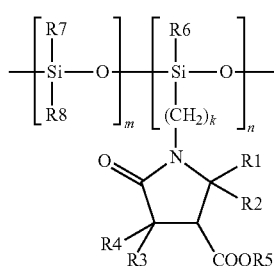
(1a)

where R1 to R5 each represent a hydrogen atom or a C1-C4 lower alkyl group, R6 to R8 represent a C1-C4 lower alkyl group, and each of m, n and k is an integer indicating the number of repeating units where $m/n=0.3$ to 70 and $1 \leq k \leq 4$; and also, the number average molecular weight of the surfactant is 7,000 or lower,

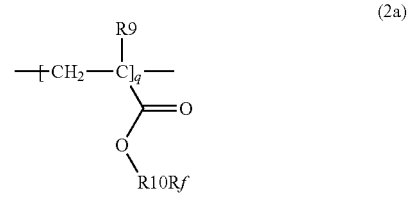
(2a)

where R9 represents a hydrogen atom or a methyl group, R10 represents a methylene group or an ethylene group, Rf represents a C7-C10 perfluoroalkyl group and q is an integer indicating the number of repeating units; and also, the number average molecular weight of the surfactant is 2,500 or lower,

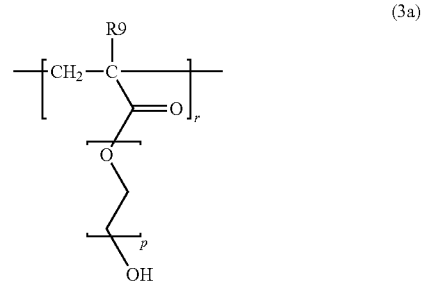
(3a)

where R9 represents a hydrogen atom or a methyl group and each of r and p is an integer indicating the number of repeating units; and also, the number average molecular weight of the surfactant is 5,500 or lower,

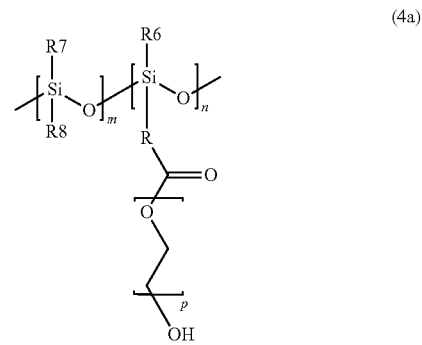
(4a)

where R6 to R8 each represent a C1-C4 lower alkyl group, R represents a C1-C4 lower alkylene group, and each of m, n and p is an integer indicating the number of repeating units where $m/n=0.3$ to 70; and also, the number average molecular weight of the surfactant is 5,000 or lower,

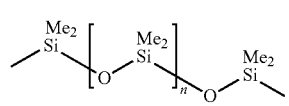
(5a)

where n is an integer indicating the number of repeating units and Me denotes a methyl group; and the number average molecular weight of the surfactant is 5,000 or lower,

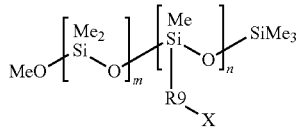

(6a)

where R9 represents a C1-C4 lower alkyl group, X represents a hydrophilic group (e.g., a hydroxy group, a carboxyl group and an amino group), each of m and n is an integer indicating the number of repeating units where m/n=0.3 to 70 and Me denotes a methyl group; and the number average molecular weight of the surfactant is 5,000 or lower,

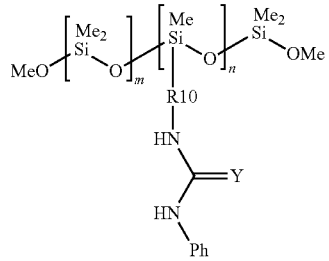

(7a)

where R10 represents a C1-C4 lower alkyl group, Y represents an oxygen atom or a sulfur atom, each of m and n is an integer indicating the number of repeating units where m/n=0.3 to 70, Me denotes a methyl group and Ph denotes a phenyl group; and the number average molecular weight of the surfactant is 5,000 or lower.

Among others, preferred are the surfactants containing a partial structure represented by General Formula (1a), in which R6 to R8 each preferably represent a methyl group and k is preferably 2. When k is small, the pyrrolidone skeleton and the silicone skeleton become closer together sterically, and the surfactant having such a structure degrades in its actions as a surfactant. When k becomes greater, the dissolvability in the compressive fluid may be decreased.

The surfactant containing the partial structure represented by General Formula (1a) is particularly preferably surfactant 1 given below. This surfactant is commercially available from Croda Japan under the trade name of "MONASIL PCA."

Surfactant 1

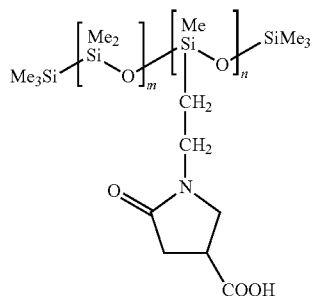

where Me denotes a methyl group.

The surfactant used in the present invention may be other surfactants than those represented by General Formulas (1a) to (7a), so long as they dissolve in the compressive fluid and have compatibility to both the compressive fluid and the ring-opening polymerizable monomer. Examples of the other surfactants include those represented by the following General Formulas (8a) to (11a), where each of m and n is an integer indicating the number of repeating units.

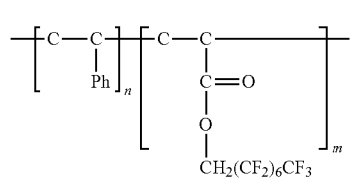

(8a)

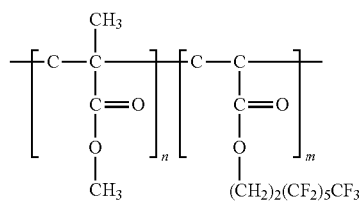

(9a)

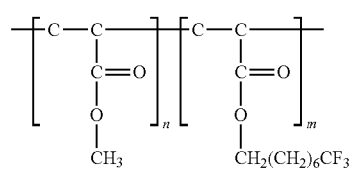

(10a)

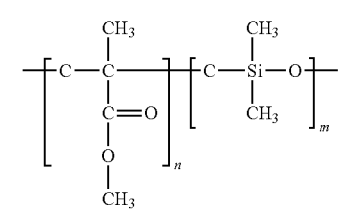

(11a)

The surfactant to be used is appropriately selected depending on the type of the compressive fluid or considering whether the target product is polymer particles and seed particles (described below) or growth particles. From the viewpoint of sterically and electrostatically preventing the resultant polymer particles from being aggregated, particularly preferred are surfactants that have high compatibility and adsorbability to the surfaces of the polymer particles and also have high compatibility and dissolvability to the compressive fluid. Of these surfactants, particularly preferred are those having a block structure of hydrophilic groups and hydrophobic groups, since they have an excellent granularity.

Also, in order to increase steric repulsion between the particles, the surfactants selected have a molecular chain of a certain length, preferably have a number average molecular weight of 10,000 or higher. However, when the molecular weight is too large, the surfactant is considerably increased in liquid viscosity, causing poor operability and poor stirring performance. As a result, a large amount of the surfactant may be deposited on the surfaces of some particles while a small amount of the surfactant may be deposited on the surfaces of other particles. Thus, care should be taken about selection of the surfactant.

The amount of the surfactant used varies depending on the type of the ring-opening polymerizable monomer or the surfactant. In general, it is preferably 0.1% by mass to 10% by mass, more preferably 1% by mass to 5% by mass, relative to the amount of the compressive fluid.

When the concentration of the surfactant in the compressive fluid is low, the produced polymer particles have a relatively large particle diameter. When the concentration of the surfactant in the compressive fluid is high, the produced polymer particles have a small particle diameter. However, even when used in an amount exceeding 10% by mass, the surfactant does not contribute to the production of the polymer particles having a small particle diameter.

The particles produced at an early stage of polymerization are stabilized by the surfactant existing in equilibrium between the compressive fluid and the surfaces of the polymer particles. However, when the ring-opening polymerizable monomer is contained in the compressive fluid in a considerably large amount, the concentration of the polymer particles becomes high, resulting in that the polymer particles disadvantageously aggregate regardless of steric repulsion caused by the surfactant.

Further, when the amount of the ring-opening polymerizable monomer is extremely larger than that of the compressive fluid, the produced polymer is totally dissolved, resulting in that the polymer is precipitated only after the polymerization proceeds to some extent. In this case, the precipitated polymer particles are in the form of highly adhesive aggregated matter.

For this reason, limitation is imposed on the amount of the ring-opening polymerizable monomer used for producing polymer particles relative to the compressive fluid. The amount thereof is preferably 500 parts by mass or less, more preferably 250 parts by mass or less, relative to 100 parts by mass of the compressive fluid. However, since the density of the ring-opening polymerizable monomer varies depending on the state of the compressive fluid, the amount of the ring-opening polymerizable monomer also varies depending on the state of the compressive fluid.

The production method according to a first embodiment of the present invention can produce polymer particles having an average particle diameter of submicron to 1 mm. The particle diameter can be controlled by controlling, for example, the pressure, temperature and reaction time during the reaction, and the amount of the surfactant used. If necessary, by varying the reaction conditions, various polymer particles from truly spherical polymer particles to amorphous polymer particles can be obtained.

The polymerization method employable in the present invention is, for example, dispersion polymerization, suspension polymerization and emulsion polymerization, and may be selected from these methods depending on the intended purpose. In particular, dispersion polymerization is superior to suspension polymerization or emulsion polymerization, since it can make the most of the advantages of the compressive fluid, monodispersed polymer particles can be obtained, and the produced polymer particles have a narrow particle size distribution.

In an another employable method, polymer particles (seed particles), having a smaller particle diameter than the target particle diameter and a narrow particle size distribution, are added in advance and grown through reaction with the monomer in the same system as described above.

The monomer used in the growth reaction may be the same as or different from that used for producing the seed particles. The produced polymer must be dissolved in the compressive fluid.

By returning the compressive fluid in which the polymer produced in the above-described method has been dispersed to the normal temperature and normal pressure, dried polymer particles can be obtained.

In a first embodiment of the present invention, a polymerization initiator may be employed. Examples of the polymerization initiator include aliphatic monoalcohols and polyalcohols.

Examples of the aliphatic monoalcohol include methanol, ethanol, propanol, isopropanol, butanol, hexanol and pentanol.

Examples of the aliphatic polyalcohol include ethylene glycol, propylene glycol, 1,3-butanediol, 1,4-butanediol, 2,3-butanediol, diethylene glycol, triethylene glycol, 1,5-pentanediol, 1,6-hexanediol, neopentyl glycol, 2-ethyl-1,3-hexanediol, polyethylene glycol, triethanol amine, hydrogenated bisphenol A, and divalent alcohols obtained by adding to bisphenol A a cyclic ether such as ethylene oxide or propylene oxide.

One exemplary process of the polymerization is as follows. Specifically, a surfactant is completely dissolved in a compressive fluid; one or more ring-opening polymerizable monomers and a polymerization initiator are added to the compressive fluid; and the resultant mixture is heated to a temperature corresponding to the decomposition rate of the polymerization initiator while stirred at a rate at which the flow of the reaction container becomes uniform. In general, the heating temperature is preferably 40° C. to 100° C., more preferably 50° C. to 85° C.

Notably, the temperature at an early stage of the polymerization greatly influences the particle diameter of the produced polymer particles. Thus, in a more preferable manner, after addition of the ring-opening polymerizable monomer, the temperature of the resultant mixture is increased to the polymerization temperature, and then the polymerization initiator is dissolved in a small amount of the compressive fluid and added to the mixture.

Upon polymerization, the reaction container must be purged with an inert gas (e.g., nitrogen gas, argon gas or carbon dioxide gas) to sufficiently remove water contained in the air of the reaction container. When water is not removed sufficiently, the particle diameter of the produced polymer particles cannot be made to be uniform, resulting in that fine particles are easily formed.

In order to increase the polymerization rate, the polymerization must be performed for 5 hours to 72 hours. The polymerization speed can be increased by terminating the polymerization when the desired particle diameter and particle size distribution are attained, by gradually adding the polymerization initiator, or by performing the reaction under high-pressure conditions.

<Addition Polymerizable Monomer>

The addition polymerizable monomer may be appropriately selected in consideration of the intended use of the obtained polymerized polymer. Examples thereof include addition polymerizable monomers having an unsaturated double bond such as vinyl monomers. Also, a wide variety of addition polymerizable monomers are commercially available.

Examples of the addition polymerizable monomer include styrene compounds such as styrene, o-methylstyrene, m-methylstyrene, p-methylstyrene, p-methoxystyrene and p-ethylstyrene; methyl acrylate, ethyl acrylate, propyl acrylate, n-butyl acrylate, isobutyl acrylate, n-octyl acrylate, dodecyl acrylate, 2-ethylhexyl acrylate, stearyl acrylate, phenyl acrylate, dimethylaminoethyl acrylate, diethylaminoethyl acrylate, and methacrylates including methyl methacrylate, ethyl methacrylate, propyl methacrylate, n-butyl methacrylate, isobutyl methacrylate, n-octyl methacrylate, dodecyl methacrylate, 2-ethylhexyl methacrylate, stearyl methacrylate, phenyl methacrylate, dimethylaminoethy methacrylate and diethylaminoethy methacrylate; acrylonitrile; methacrylonitrile; and acrylamide.

In the present invention, the polymerization system contains a surfactant that dissolves in the compressive fluid and has compatibility to both the compressive fluid and the addition polymerizable monomer. For example, when supercritical carbon dioxide is used as the compressive fluid, the surfactant having a $CO_2$-philic group (a group having compatibility to carbon dioxide) and a monomer-philic group (a group having compatibility to monomer) in the molecule is used. Examples of the $CO_2$-philic group include a perfluoroalkyl group, a polydimethylsiloxane group, an ether group and a carbonyl group. The monomer-philic group is preferably a polymer chain formed of the addition polymerizable monomers used.

When the surfactant is incorporated into the polymerization system, the surfactant may be added to the compressive fluid or the polymerizable monomer.

Examples of the surfactant include fluorine-containing surfactants and silicone surfactants. In the present invention, the silicone surfactant is used. The silicone surfactant is preferably a silicone surfactant represented by the following General Formula (1), (2) or (3).

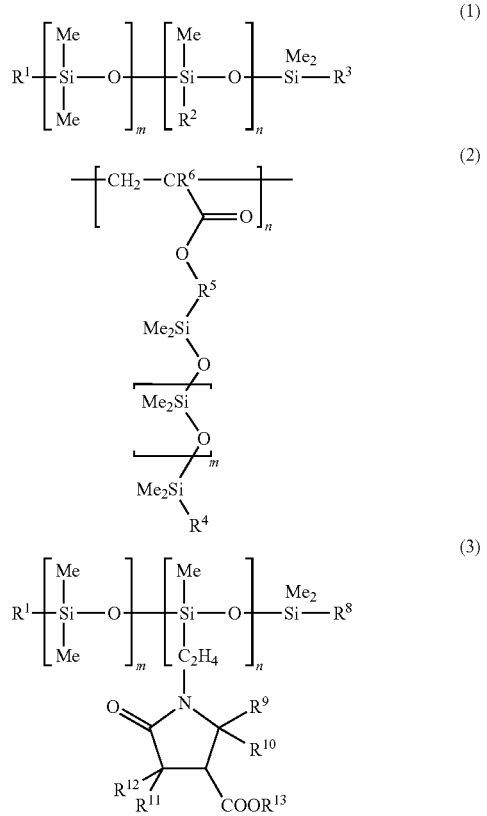

In General Formula (1), Me denotes a methyl group; one or two among $R^1$, $R^2$ and $R^3$ each represent a residue containing a C6-C30 long-chain alkyl group and the rest represents a residue containing a C1-C4 lower alkyl group; and each of m and n is an integer of 1 or greater indicating the number of repeating units. In General Formula (2), $R^4$ and $R^6$ each represent a hydrogen atom or a methyl group, $R^5$ represents a methylene group or an ethylene group, and each of m and n is an integer of 1 or greater indicating the number of repeating units. In General Formula (3), at least one of $R^7$ and $R^8$ represents a residue containing a C6-C30 long-chain alkyl group and the other represents a residue containing a C1-C4 lower alkyl group; $R^9$ to $R^{13}$ each represent a hydrogen atom or a C1-C4 lower alkyl group; and each of m and n is an integer of 1 or greater indicating the number of repeating units.

Here, the above long-chain alkyl group refers to alkyl groups having 6 or more carbon atoms. The upper limit of the number of carbon atoms of the long-chain alkyl group is not particularly limited, but excessively long alkyl groups may have poor compatibility to the compressive fluid. Thus, the number of carbon atoms of the long-chain alkyl group is preferably 6 to 30, more preferably 8 to 28.

Examples of the C1-C4 lower alkyl group include a methyl group, an ethyl group, various propyl groups and various butyl groups. Examples of the C6-C30 long-chain alkyl group include various hexyl groups, various heptyl groups, various octyl groups, various nonyl groups, various decyl groups, various undecyl groups, various dodecyl groups, various tridecyl groups, various tetradecyl groups, various pentadecyl groups, various hexadecyl groups, various heptadecyl groups, various octadecyl groups and various icosyl groups.

"m" is generally about 1 to about 70, preferably 10 to 40. "n" is generally about 1 to about 30, preferably 10 to 20.

Specific examples of the surfactants represented by General Formula (1) include the following.

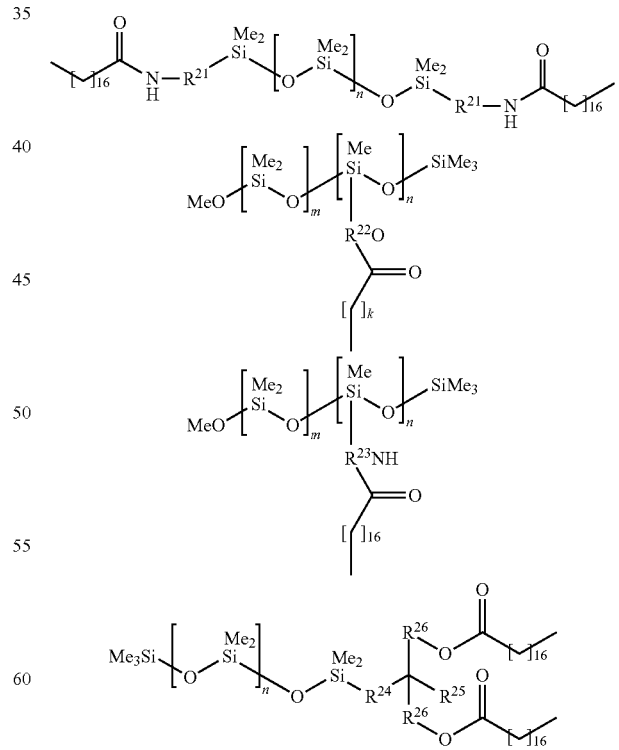

where Me denotes a methyl group, $R^{21}$ to $R^{26}$ each represent an alkyl group and k is 4, 16 or 28; and each of m and n is an integer indicating the number of repeating units.

Specific examples of the surfactants represented by General Formula (2) include the following.

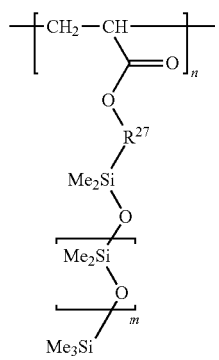

where Me denotes a methyl group and $R^{27}$ represents a methylene group or an ethylene group; and each of m and n is an integer indicating the number of repeating units.

Specific examples of the surfactants represented by General Formula (3) include the following. Notably this compound is commercially available from Croda Co. under the product name of "MONASIL PCA."

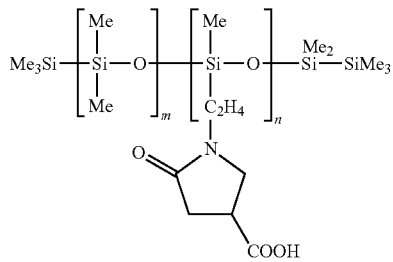

where Me denotes a methyl group; and each of m and n is an integer indicating the number of repeating units.

The silicone surfactants can be obtained with a common synthesis method. For example, silicone oil serving as a raw material is changed in molecular weight and viscosity through amidation or esterification using reactive silicone oil whose end or side chain has been modified, whereby surfactants having various properties can be obtained.

Examples of the reactive silicone oil include silicon oils diol-modified at a single end, those carbinol-modified at a single end, those carboxyl-modified at a single end, those carbinol-modified at a side chain, those amino-modified at a side chain, those amino-modified at a side chain and methoxy-modified at both ends, those carboxyl-modified at a side chain, those carbinol-modified at both ends, those amino-modified at both ends, those silanol-modified at both ends and those carboxyl-modified at both ends.

The silicone surfactant to be used is appropriately selected depending on the type of the compressive fluid or considering whether the target product is polymer particles or seed particles (described below). From the viewpoint of sterically preventing the resultant polymer particles from being aggregated, particularly preferred are silicone surfactants that have high compatibility and adsorbability to the surfaces of the polymer particles and also have high compatibility and dissolvability to the compressive fluid.

Also, in order to increase steric repulsion between the particles, the silicone surfactants selected have a molecular chain of a certain length, preferably have a number average molecular weight of 10,000 or higher.

However, when the number average molecular weight is too large, the silicone surfactant is considerably increased in liquid viscosity, causing poor operability and poor stirring performance. As a result, a large amount of the silicone surfactant may be deposited on the surfaces of some particles while a small amount of the silicone surfactant may be deposited on the surfaces of other particles. Thus, care should be taken about selection of the silicone surfactant.

The amount of the silicone surfactant used varies depending on the type of the addition polymerizable monomer or the surfactant. In general, it is preferably 0.1 parts by mass to 10 parts by mass, more preferably 1 part by mass to 5 parts by mass, relative to 100 parts by mass of the compressive fluid.

When the concentration of the surfactant in the compressive fluid is low, the produced polymer particles have a relatively large particle diameter. When the concentration of the surfactant in the compressive fluid is high, the produced polymer particles have a small particle diameter. However, even when used in an amount exceeding 10% by mass, the surfactant does not contribute to the production of the polymer particles having a small particle diameter.

Also, use of fine powder of an inorganic compound in combination with the silicone surfactant further promotes stabilization of the produced polymer particles and improvement of the particle size distribution.

The particles produced at an early stage of polymerization are stabilized by the surfactant existing in equilibrium between the compressive fluid and the surfaces of the polymer particles. However, when unreacted addition polymerizable monomers are contained in the compressive fluid in a considerably large amount, the concentration of the polymer particles becomes high, resulting in that the polymer particles disadvantageously aggregate regardless of steric repulsion caused by the surfactant.

Further, when the amount of the addition polymerizable monomer is extremely larger than that of the compressive fluid, the produced polymer is disadvantageously dissolved in the monomer, resulting in that the polymer is precipitated only after the polymerization proceeds to some extent. In this case, the precipitated polymer particles are in the form of aggregated matter rather than particles.

For this reason, limitation is imposed on the amount of the addition polymerizable monomer used for producing polymer particles relative to the compressive fluid. The amount thereof is preferably 500 parts by mass or less, more preferably 250 parts by mass or less, relative to 100 parts by mass of the compressive fluid. However, since the density of the addition polymerizable monomer varies depending on the state of the compressive fluid, the amount of the addition polymerizable monomer also varies depending on the state of the compressive fluid.

In a second embodiment of the present invention, the addition polymerizable monomer is polymerized to obtain polymer particles. Regarding the polymerization method, dispersion polymerization is superior to suspension polymerization or emulsion polymerization, since it can make the most of the advantages of the compressive fluid, monodispersed polymer particles can be obtained, and the produced polymer particles have a narrow particle size distribution.

In an another employable method, polymer particles (seed particles), having a smaller particle diameter than the target particle diameter and a narrow particle size distribution, are added in advance and grown through reaction with the monomer in the same system as described above.

The monomer used in the growth reaction may be the same as or different from that used for producing the seed particles. The produced polymer must be dissolved in the compressive fluid.

By returning the compressive fluid in which the polymer produced in the above-described method has been dispersed to the normal temperature and normal pressure (25° C., 0.1 MPa), dried polymer particles can be obtained.

In a second embodiment of the present invention, a polymerization initiator may be used for polymerizing the addition polymerizable monomer. The polymerization initiator may be commonly used radical initiators.

Examples of the radical initiator include azo polymerization initiators such as 2,2'-azobisisobutylonitrile (AIBN), azobis(2,4-dimethylvaleronitrile) and 1,1'-azobis(cyclohexane-1-carbonitrile); and peroxide initiators such as lauryl peroxide, benzoyl peroxide, tert-butyl peroctoate, methyl ethyl ketone peroxide, isopropyl peroxycarbonate, cumene hydroperoxide, 2,4-dichlorobenzoyl peroxide and potassium persulfate. In addition, there are used systems in which the above peroxide initiator is used in combination with sodium thiosulfate, amine, etc.

The amount of the polymerization initiator used is preferably 0.1 parts by mass to 10 parts by mass relative to 100 parts by mass of the addition polymerizable monomer.

One exemplary process of the polymerization is as follows. Specifically, a silicone surfactant is completely dissolved in a compressive fluid; one or more addition polymerizable monomers and a polymerization initiator are added to the compressive fluid; and the resultant mixture is heated to a temperature corresponding to the decomposition rate of the polymerization initiator while stirred at a rate at which the flow of the reaction container becomes uniform. In general, the heating temperature is preferably 40° C. to 100° C., more preferably 50° C. to 85° C.

Notably, the temperature at an early stage of the polymerization greatly influences the particle diameter of the produced polymer particles. Thus, in a more preferable manner, after addition of the addition polymerizable monomer, the temperature of the resultant mixture is increased to the polymerization temperature, and then the initiator is dissolved in a small amount of the compressive fluid and added to the mixture.

Upon polymerization, the reaction container must be purged with an inert gas (e.g., nitrogen gas, argon gas or carbon dioxide gas) to sufficiently remove oxygen contained in the air of the reaction container. When oxygen is not purged sufficiently, fine particles are easily formed.

In order to increase the polymerization rate, the polymerization must be performed for 5 hours to 72 hours. The polymerization speed can be increased by terminating the polymerization when the desired particle diameter and particle size distribution are attained, by gradually adding the polymerization initiator, or by performing the reaction under high-pressure conditions.

Also, in polymerizing the addition polymerizable monomer, a compound having a high chain transfer constant may be used together to control the average molecular weight.

Examples of the compound having a high chain transfer constant include low-molecular-weight compounds having a mercapto group, carbon tetrachloride and carbon tetrabromide. Examples of other compounds preferably used include halogenated hycrocarbons such as ethyl acetate dibromide, ethyl acetate tribromide, ethyl benzene dibromide, ethane bromide and ethane dichloride; hydrocarbons such as diazothio ether, benzene, ethylbenzene and isopropylbenzene; mercaptans such as tert-dodecyl mercaptan and n-dodecyl mercaptan; disulfides such as diisopropylxanthogen disulfide; thioglycolic acid derivatives such as thioglycolic acid, 2-ethylhexyl thioglycolate, butyl thioglycolate, methoxybutyl thioglycolate, trimethylolpropane tris(thioglycolate) and ammonium thioglycolate; and thioglycerol.

The amount of the chain transfer agent used may be $10^{-3}$ parts by mass to 10 parts by mass relative to 100 parts by mass of the addition polymerizable monomer.

When the chain transfer agent is added before initiation of polymerization, the molecular weight of the polymer produced at an early stage can be adjusted to control the size of the precipitated nuclear particles.

When the chain transfer agent is added after precipitation of nuclear particles, the molecular weight of the produced polymer particles can be adjusted to obtain flowability when the polymer particles are melted through application of heat of a desired amount.

The polymer particles of the present invention produced in this manner have a molecular weight distribution (Mw/Mn: Mw denotes a weight average molecular weight and Mn denotes a number average molecular weight) of 2.0 or lower.

EXAMPLES

The present invention will next be described in more detail by way of Examples and Comparative Examples, which should not be construed as limiting the present invention thereto.

Notably, regarding the polymers produced in Examples and Comparative Examples, the number average molecular weight and the conversion rate of monomer to polymer were measured as follows.

<Measurement of Number Average Molecular Weight of Polymer>

The number average molecular weight was measured through gel permeation chromatography or GPC under the following conditions.
Apparatus: GPC-8020 (product of TOSOH CORPORATION)
Column: TSK G2000HXL and G4000HXL (product of TOSOH CORPORATION)
Temperature: 40° C.
Solvent: Tetrahydrofuran or THF
Flow rate: 1.0 mL/min First, a calibration curve of molecular weight was obtained using monodispersed polystyrene serving as a standard sample. A polymer sample (1 mL) having a polymer concentration of 0.5% by mass was applied and measured under the above conditions, to thereby obtain the molecular weight distribution of the polymer. The number average molecular weight Mn and the weight average molecular weight Mw of the polymer were calculated from the calibration curve. The molecular weight distribution is a value calculated by dividing Mw with Mn.

<Electron Microscopic Observation of Polymer>

The polymer was observed with a scanning electron microscope or SEM under the following conditions.
Apparatus: JSM-5600 (product of JEOL Ltd.)
Secondary electron image resolution: 3.5 nm
Magnification: ×18 to ×300,000 (136 steps in total)
Applied current: $10^{-12}$ A to $10^{-8}$ A
Acceleration voltage: 0.5 kV to 30 kV (53 steps)
Sample holder: 10 mm (diameter)×10 mmh sample holder 32 mm (diameter)×10 mmh sample holder
Maximum size of sample: 15.24 cm (6 inch) (diameter)
Pixel count: 640×480, 1,280×960

<Conversion Rate of Monomer to Polymer (Mol %)=100− Amount of Unreacted Monomer (Mol %)>

In the case of polylactic acid, the amount of unreacted monomer (mol %) was calculated in deuterated chloroform with a nuclear magnetic resonance apparatus JNM-AL300 (product of JEOL Ltd.) as a value obtained as follows: 100× the ratio of a quartet peak area attributed to lactide (4.98 ppm to 5.05 ppm) to a quartet peak area attributed to polylactic acid (5.10 ppm to 5.20 ppm).

In the case of polycaprolactone, the amount of unreacted monomer (mol %) was calculated in deuterated chloroform with a nuclear magnetic resonance apparatus JNM-AL300 (product of JEOL Ltd.) as a value obtained as follows: 100× the ratio of a triplet peak area attributed to caprolactone (4.22 ppm to 4.25 ppm) to a triplet peak area attributed to polycaprolactone (4.04 ppm to 4.08 ppm).

In the case of polycarbonate, the amount of unreacted monomer (mol %) was calculated in deuterated chloroform with a nuclear magnetic resonance apparatus JNM-AL300 (product of JEOL Ltd.) as a value obtained as follows: 100× the ratio of a singlet peak area attributed to ethylene carbonate (4.54 ppm) to a quartet peak area attributed to polycarbonate (4.22 ppm to 4.25 ppm).

Synthesis Example A1

Synthesis of surfactant A2

1H,1H-Perfluorooctyl acrylate (product of AZmax. co) (1,250 parts by mass) and 2,2'-azobis(2,4-dimethylvaleronitrile) (product of Wako Pure Chemical Industries, Ltd., V-65) (62.5 parts by mass) were charged into a pressure-resistant cell (in an amount of 50% by volume of the pressure-resistant cell). Carbon dioxide was selected as a supercritical fluid and supplied into the above reaction cell with a supply bomb. The reaction was performed for 24 hours while the pressure and the temperature were being adjusted to 15 MPa and 85° C. with a pressure pump and a temperature controller.

Next, the temperature was decreased to 0° C., and the pressure was decreased to normal pressure using a back pressure valve, to thereby obtain surfactant A2 having the following Structural Formula. The number average molecular weight (Mn) thereof was found to be 2,500.

Surfactant A2

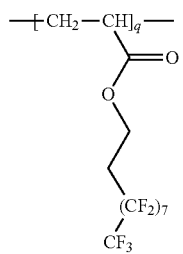

Synthesis Example A2

Synthesis of Surfactant A3

Polyacrylic acid 5,000 (product of Wako Pure Chemical Industries, Ltd.) (36.1 parts by mass), chloroform (product of Wako Pure Chemical Industries, Ltd.) (1,480 parts by mass) and 1,1'-carbonylbis-1H-imidazole (128 parts by mass) were added to a 6 mL-vial container, followed by stirring at room temperature for 10 min.

Next, polyethylene glycol (product of Wako Pure Chemical Industries, Ltd., molecular weight: 200) (500 parts by mass) was added thereto, followed by stirring at room temperature for 12 hours.

Next, chloroform was added thereto, followed by washing with water.

Next, the resultant reaction mixture was dried with sodium sulfate anhydrate, filtrated and concentrated under reduced pressure, to thereby obtain surfactant A3 having the following Structural Formula (yield: 73% by mass). The number average molecular weight thereof was found to be 5,200.

Surfactant A3

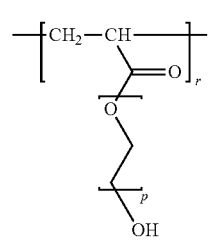

Synthesis Example A3

Synthesis of Surfactant A4

Silicone oil carboxy-modified at its side chain (product of Shin-Etsu Silicones Co., KF-8012, number average molecular weight: 4,500) (12 parts by mass), chloroform (product of Wako Pure Chemical Industries, Ltd.) (33.3 parts by mass), 1,1'-carbonylbis-1H-imidazole (product of Wako Pure Chemical Industries, Ltd., molecular weight: 200) (0.65 parts by mass) and polyethylene glycol (product of Wako Pure Chemical Industries, Ltd., molecular weight: 200) (0.80 parts by mass) were added to a 50 mL-egg plant flask, followed by stirring at room temperature for 12 hours.

Next, a saturated sodium hydrogen carbonate aqueous solution was added thereto and the sodium stearate that precipitated was filtered off with a kiriyama funnel, followed by washing with a saturated sodium hydrogen carbonate aqueous solution.

Next, the resultant reaction mixture was dried with sodium sulfate anhydrate, filtrated with silica gel and concentrated under reduced pressure, to thereby obtain surfactant A4 having the following Structural Formula (yield: 91% by mass). The number average molecular weight thereof was found to be 4,700.

Surfactant A4

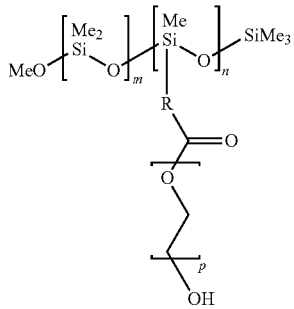

Synthesis Example A4

Synthesis of Surfactant A9

Silicone oil amino-modified at its side chain and methoxy-modified at both ends (product of Shin-Etsu Silicones Co., KF-857, molecular weight: 790) (7.9 parts by mass), dichloromethane (product of Tokyo Chemical Industry Co., Ltd.)

(66.6 parts by mass) and phenyl isocyanate (product of KANTO KAGAKU) (3.6 parts by mass) were added to a 300 mL-egg plant flask, followed by stirring at room temperature for 24 hours. Thereafter, hexane was added thereto, followed by washing with distilled water. The resultant reaction mixture was dried with sodium sulfate anhydrate and filtrated with cotton and silica gel, and the solvent was evaporated under reduced pressure, to thereby obtain surfactant A9 having the following Structural Formula (yield: 80%).

Synthesis Example A5

Synthesis of Surfactant A10

The procedure of Synthesis Example A4 was repeated, except that phenyl isocyanate was changed to phenyl isothiocyanate (product of Wako Pure Chemical Industries, Ltd.) (4.0 parts by mass), to thereby obtain surfactant A10.

Example A1

A micro tube was charged with L-lactide (882.4 parts by mass), 4-dimethylaminopyridine (48.9 parts by mass), surfactant A1 (49.7 parts by mass) and anhydrous ethanol (9.2 parts by mass). The micro tube was placed in a pressure-resistant container and heated to 60° C. Then, supercritical carbon dioxide (60° C., 10 MPa) was charged thereinto, followed by reaction at 60° C. for 2 hours.

Next, the pressure pump and the back pressure valve were used to adjust the flow rate at the outlet of the back pressure valve to 5.0 L/min. Then, supercritical carbon dioxide was allowed to flow for 30 min. After the organic catalyst and the residual monomers had been removed, the reaction system was gradually returned to normal temperature and normal pressure. Three hours after, polymer particles A1 contained in the container were taken out.

Figure 3:
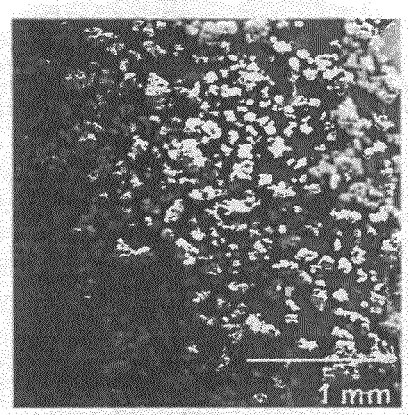
FIG. 3 is an electron microscope image showing the aggregation state of polymer particles A1.
Figure 4:
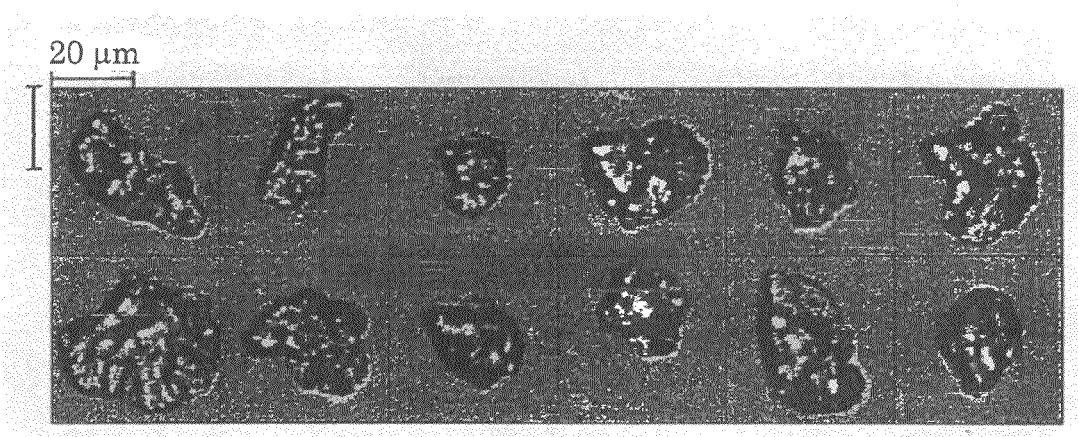
FIG. 4 is an electron microscope image of each of polymer particles A1.
Figure 5:
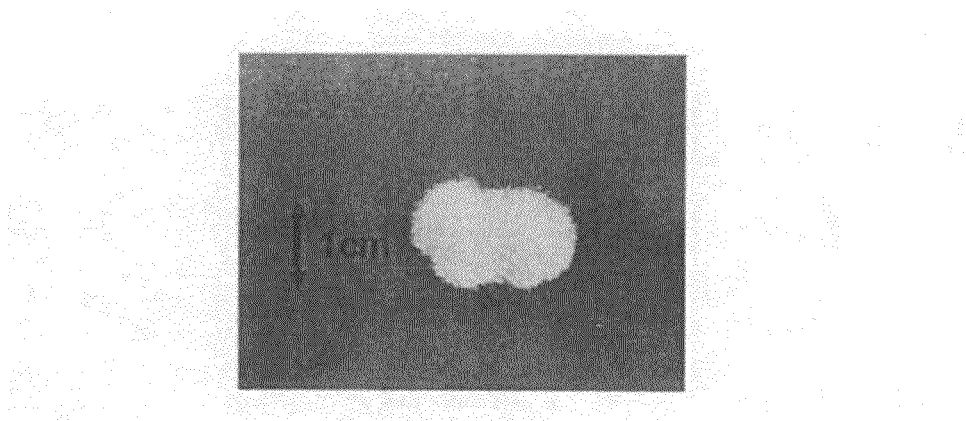
FIG. 5 is an image obtained by photographing polymer particles A1 with a digital camera.

FIG. 3 is an electron microscope image showing the aggregation state of polymer particles A1. FIG. 4 is an electron microscope image of each of polymer particles A1. FIG. 5 is an image obtained by photographing polymer particle A1 with a digital camera. As is clear from these images, the produced polymer particles were found to have a size of about 40 μm or less.

Also, with the above method, polymer particles A1 were measured for physical properties (Mn, Mw/Mn, polymer conversion rate), which are shown in Table A1.

Examples A2 to A24

The procedure of Example A1 was repeated, except that the catalyst used, the type and amount of the surfactant, the type of the monomer and the reaction conditions are changed as shown in the respective columns of Examples A2 to A24 in Tables A1 and A2, to thereby obtain polymer particles A2 to A24. Notably, surfactants A5 to A8 have structures expressed by the following General Formulas.

Surfactant A5

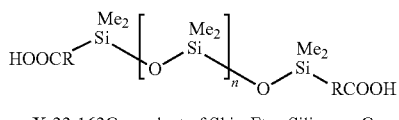

X-22-162C: product of Shin-Etsu Silicones Co.

Surfactant A6

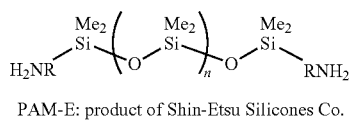

PAM-E: product of Shin-Etsu Silicones Co.

Surfactant A7

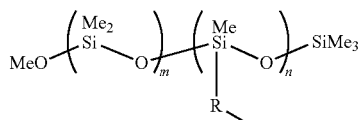

X-22-3701E: product of Shin-Etsu Silicones Co.

Surfactant A8

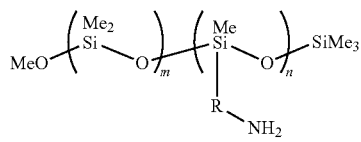

KF-868: product of Shin-Etsu Silicones Co.

From electron photographic images of the polymer particles photographed in the same manner as in Example A1, the polymer particles were found to be somewhat varied in size but have a similar size to those of Example A1.

Also, with the above method, these polymer particles were measured for physical properties (Mn, Mw/Mn, polymer conversion rate), which are shown in Tables A1 and A2.

Comparative Examples A1 and A2

The procedure of Example A1 was repeated, except that no surfactant was used, and the type and amount of the monomer were changed as shown in the columns of Comparative Examples A1 and A2 in Table A2 for producing polymer particles. As a result, only aggregated polymer could be obtained.

Figure 6:
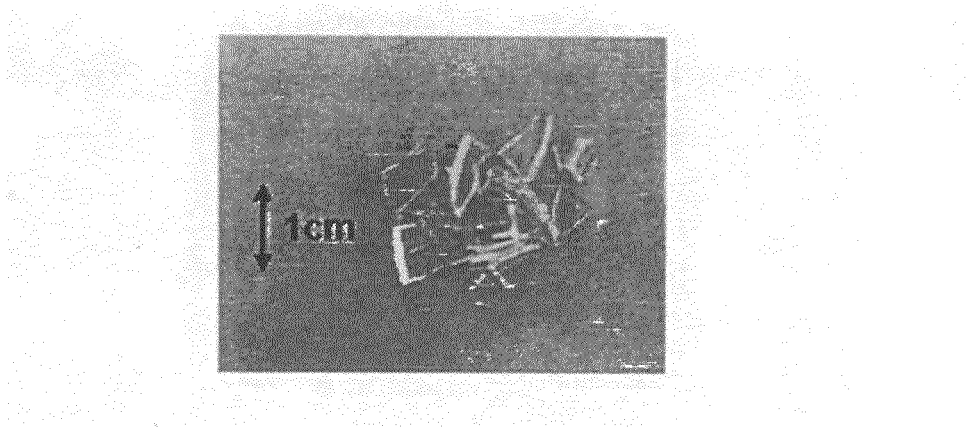
FIG. 6 is an image obtained by photographing an aggregated polymer of Comparative Example A1 with a digital camera.

With the above method, the aggregated polymer was measured for physical properties (Mn, Mw/Mn, polymer conversion rate), which are shown in Table A2. Also, FIG. 6 is a photograph of the aggregated polymer of Comparative Example A1, which was taken with a digital camera.

TABLE A1

|  | Ex. A1 | Ex. A2 | Ex. A3 | Ex. A4 | Ex. A5 | Ex. A6 | Ex. A7 | Ex. A8 | Ex. A9 | Ex. A10 | Ex. A11 | Ex. A12 |
|---|---|---|---|---|---|---|---|---|---|---|---|---|
| Catalyst | DMAP | DMAP | DMAP | DMAP | DMAP | DMAP | DMAP | DMAP | DMAP | DMAP | DMAP | DMAP |
| Surfactant | 1 | 1 | 1 | 1 | 1 | 1 | 1 | 1 | 1 | 1 | 1 | 1 |
| Amount of surfactant (parts by mass) | 50 | 50 | 50 | 50 | 50 | 50 | 50 | 50 | 50 | 50 | 50 | 50 |

TABLE A1-continued

|  | Ex. A1 | Ex. A2 | Ex. A3 | Ex. A4 | Ex. A5 | Ex. A6 | Ex. A7 | Ex. A8 | Ex. A9 | Ex. A10 | Ex. A11 | Ex. A12 |
|---|---|---|---|---|---|---|---|---|---|---|---|---|
| Type of monomer | L-lactide | L-lactide (80 mol %) δ-valero-lactone (20 mol %) | L-lactide (80 mol %) ε-capro-lactone (20 mol %) | L-lactide (80 mol %) cyclic carbonate (20 mol %) | L-lactide | L-lactide | L-lactide | L-lactide | L-lactide | L-lactide | L-lactide | L-lactide |
| Pressure (MPa) | 8 | 8 | 8 | 8 | 8 | 8 | 8 | 8 | 4 | 5 | 10 | 16 |
| Temperature (° C.) | 60 | 60 | 60 | 60 | 25 | 35 | 80 | 100 | 80 | 60 | 60 | 60 |
| Number average molecular weight (Mn) | 12000 | 18000 | 20000 | 18000 | 8500 | 7700 | 11000 | 14000 | 7700 | 10000 | 11000 | 13000 |
| Molecular weight distribution (Mw/Mn) | 1.3 | 1.1 | 1.4 | 1.3 | 1.4 | 1.2 | 1.4 | 1.3 | 1.5 | 1.5 | 1.4 | 1.4 |
| Monomer conversion rate (mol %) | 96 | 97 | 98 | 96 | 76 | 81 | 92 | 90 | 68 | 86 | 95 | 95 |

TABLE A2

|  | Ex. A13 | Ex. A14 | Ex. A15 | Ex. A16 | Ex. A17 | Ex. A18 | Ex. A19 | Ex. A20 | Ex. A21 | Ex. A22 | Ex. A23 | Ex. A24 | Comp. Ex. A1 | Comp. Ex. A2 |
|---|---|---|---|---|---|---|---|---|---|---|---|---|---|---|
| Catalyst | DABCO | DBU | PPY | DMAP | DMAP | DMAP | DMAP | DMAP | DMAP | DMAP | DMAP | DMAP | DMAP | DMAP |
| Surfactant | 1 | 1 | 1 | 2 | 3 | 4 | 5 | 6 | 7 | 8 | 9 | 10 | — | — |
| Amount of surfactant (parts by mass) | 50 | 50 | 50 | 72 | 83 | 85 | 87 | 89 | 83 | 84 | 85 | 85 | — | — |
| Type of monomer | L-lactide | L-lactide | L-lactide | L-lactide | L-lactide | L-lactide | L-lactide | L-lactide | L-lactide | L-lactide | L-lactide | L-lactide | L-lactide | L-lactide (80 mol %) ε-capro-lactone (20 mol %) |
| Pressure (MPa) | 8 | 8 | 8 | 8 | 8 | 8 | 8 | 8 | 8 | 8 | 8 | 8 | 8 | 8 |
| Temperature (° C.) | 60 | 60 | 60 | 60 | 60 | 60 | 60 | 60 | 60 | 60 | 60 | 60 | 60 | 60 |
| Number average molecular weight (Mn) | 12000 | 14000 | 13000 | 20000 | 19000 | 12000 | 13000 | 20000 | 19000 | 12000 | 19000 | 12000 | 12000 | 13000 |
| Molecular weight distribution (Mw/Mn) | 1.5 | 1.4 | 1.4 | 1.2 | 1.3 | 1.4 | 1.3 | 1.2 | 1.3 | 1.4 | 1.3 | 1.3 | 1.4 | 1.6 |
| Monomer conversion rate (mol %) | 94 | 94 | 91 | 88 | 90 | 95 | 91 | 88 | 90 | 95 | 90 | 95 | 92 | 91 |

Synthesis Example B1

Synthesis of Surfactant B1

Silicone oil amino-modified at both ends (product of Shin-Etsu Silicones Co., PAM-E) (1.4 parts by mass), chloroform (product of Wako Pure Chemical Industries, Ltd.) (33.3 parts by mass), anhydrous pyridine (product of KANTO KAGAKU) (1.7 parts by mass) and stearoyl chloride (product of Aldrich) (1.4 parts by mass) were added to a 50 mL-egg plant flask, followed by stirring at room temperature for 12 hours, to thereby obtain a reaction mixture.

A saturated sodium hydrogen carbonate aqueous solution (5 mL) was added thereto and the sodium stearate that precipitated was filtered off with a kiriyama funnel. Then, the reaction mixture was washed with a saturated sodium hydrogen carbonate aqueous solution (5 mL×4). Subsequently, the resultant reaction mixture was dried with sodium sulfate anhydrate, filtrated with silica gel and concentrated under reduced pressure, to thereby obtain surfactant B1 having the following Structural Formula (yield: 69%).

The analytical results of surfactant B1 are as follows.

mp: 47.0° C.-53.0° C.

$^1$H NMR (CDCl$_3$, 300 MHz, MS-231-re) δ=0.044 (br, —SiCH$_3$), 0.877 (t, J=6.15 Hz, 5.45H, —CH$_3$), 1.25 (br, —CH$_2$(CH$_2$)$_{14}$CH$_3$), 1.56-1.65 (m, —CH$_2$(CH$_2$)$_{14}$CH$_3$) IR (KBr, cm$^{-1}$, MS•258) 3301.9 (NH stretching vibration), 2954.7, 2918.1, 2850.6 (s, CH$_2$ group C—H stretching vibration), 1645.2 (C=O stretching vibration)

Surfactant B1

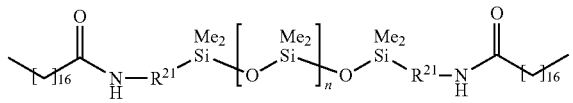

where R$^{21}$ represents an alkyl group, and each of m and n is an integer indicating the number of repeating units.

Synthesis Example B2

Synthesis of Surfactant B2

The procedure of Synthesis Example B1 was repeated, except that the silicone oil amino-modified at both ends (product of Shin-Etsu Silicones Co., PAM-E) was changed to silicone oil carbinol-modified at its side chain (product of Shin-Etsu Silicones Co., X-22-4039), to thereby obtain surfactant B2 (yield: 100%).

Surfactant B2

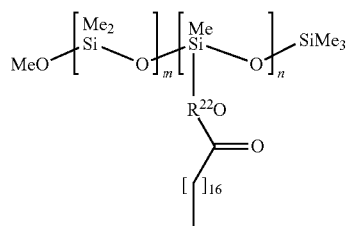

where R$^{22}$ represents an alkyl group, and each of m and n is an integer indicating the number of repeating units.

Synthesis Example B3

Synthesis of surfactant B3

The procedure of Synthesis Example B1 was repeated, except that the silicone oil amino-modified at both ends (product of Shin-Etsu Silicones Co., PAM-E) was changed to silicone oil amino-modified at its side chain (product of Shin-Etsu Silicones Co., KF-868), to thereby obtain surfactant B3 (yield: 100%).

Surfactant B3

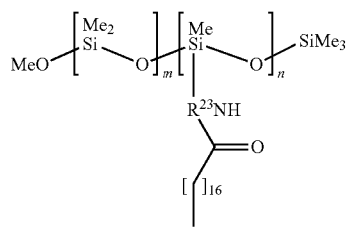

where R$^{23}$ represents an alkyl group, and each of m and n is an integer indicating the number of repeating units.

Synthesis Example B4

Synthesis of Surfactant B4

The procedure of Synthesis Example B1 was repeated, except that the silicone oil amino-modified at both ends (product of Shin-Etsu Silicones Co., PAM-E) was changed to silicone oil diol-modified at a single end (product of Shin-Etsu Silicones Co., X-22-176DX), to thereby obtain surfactant B4 (yield: 100%).

Surfactant B4

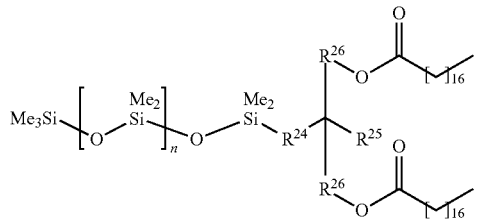

where R$^{24}$ to R$^{26}$ each represent an alkyl group, and each of m and n is an integer indicating the number of repeating units.

Synthesis Example B5

Synthesis of Surfactant B5

The procedure of Synthesis Example B1 was repeated, except that the silicone oil amino-modified at both ends (product of Shin-Etsu Silicones Co., PAM-E) was changed to silicone oil carbinol-modified at a single end (product of Shin-Etsu Silicones Co., X-22-170BX) and that the stealoyl chloride was changed to polyacrylic acid (product of Wako Pure Chemical Industries, Ltd., number average molecular weight: 5,000), to thereby obtain surfactant B5 (yield: 90%).

Surfactant B5

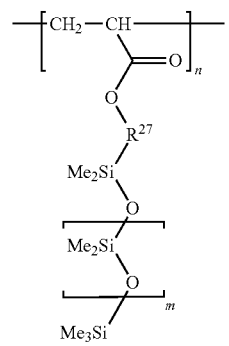

where R$^{27}$ is a methylene group or an ethylene group, and each of m and n is an integer indicating the number of repeating units.

Synthesis Example B6

Synthesis of Surfactant B6

The procedure of Synthesis Example B1 was repeated, except that the silicone oil amino-modified at both ends (product of Shin-Etsu Silicones Co., PAM-E) was changed to silicone oil carbinol-modified at its side chain (product of Shin-Etsu Silicones Co., X-22-4039) and that the stealoyl chloride was changed to melissic chloride, to thereby obtain surfactant B6 (yield: 93%).

Surfactant B6

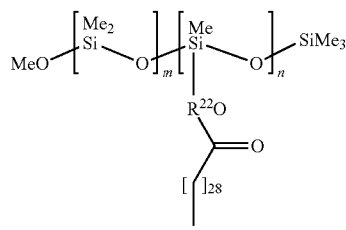

where $R^{22}$ represents an alkyl group, and each of m and n is an integer indicating the number of repeating units.

Synthesis Example B7

Synthesis of Surfactant B7

The procedure of Synthesis Example B1 was repeated, except that the silicone oil amino-modified at both ends (product of Shin-Etsu Silicones Co., PAM-E) was changed to silicone oil carbinol-modified at its side chain (product of Shin-Etsu Silicones Co., X-22-4039) and that the stealoyl chloride was changed to caproic chloride, to thereby obtain surfactant B7 (yield: 92%).

Surfactant B7

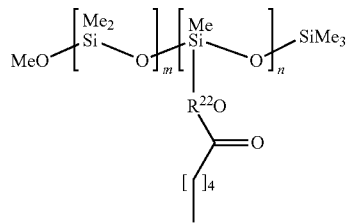

where $R^{22}$ represents an alkyl group, and each of m and n is an integer indicating the number of repeating units.

Synthesis Example B8

Synthesis of Surfactant B9

1H,1H-Perfluorooctyl acrylate (product of AZmax. co) (1,250 parts by mass) and 2,2'-azobis(2,4-dimethylvaleronitrile) (product of Wako Pure Chemical Industries, Ltd., V-65) (62.5 parts by mass) were charged into a pressure-resistant cell (in an amount of 50% by volume of the pressure-resistant cell). Carbon dioxide was selected as a supercritical fluid and supplied into the above reaction cell with a supply bomb. The reaction was performed for 24 hours while the pressure and the temperature were being adjusted to 15 MPa and 85° C. with a pressure pump and a temperature controller. Next, the temperature was decreased to 0° C., and the pressure was decreased to normal pressure using a back pressure valve, to thereby obtain surfactant B9. The number average molecular weight (Mn) of surfactant B9 was found to be 2,500.

Surfactant B9

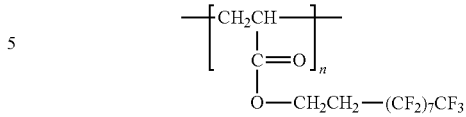

where n is an integer indicating the number of repeating units.

Example B1

(1) Preparation of Addition Polymerizable Monomer Composition

Styrene monomer (product of Wako Pure Chemical Industries, Ltd.) (20 parts by mass) and surfactant B1 (5 parts by mass) were stirred together to prepare a homogeneous polymerizable monomer composition B1.

(2) Supercritical Polymerization Step

The above-prepared polymerizable monomer composition B1 (20 parts by mass) was charged into a pressure-resistant cell (in an amount of 20% by volume of the pressure-resistant cell). Carbon dioxide was selected as a supercritical fluid and supplied into the above reaction cell with a supply bomb. The pressure and the temperature were adjusted to 30 MPa and 65° C. with a pressure pump and a temperature controller.

In addition, 2,2'-azobisisobutylonitrile (AIBN) (product of Wako Pure Chemical Industries, Ltd.) (1 part by mass) was added thereto as a polymerization initiator, followed by reaction for 40 hours.

After completion of reaction, the temperature was decreased to 5° C. while the pressure was being maintained. The pressure pump and the back pressure valve were used to adjust the flow rate at the outlet of the back pressure valve to 5.0 L/min. Then, supercritical carbon dioxide was allowed to flow for 6 hours. After the residual monomers had been removed, the reaction system was gradually returned to normal temperature and normal pressure, to thereby obtain polymer particles B1 (yield: 31%). Polymer particles B1 were found to have a number average molecular weight (Mn) of 6,886 and a molecular weight distribution (Mw/Mn) of 1.96.

Examples B2 to B7

The procedure of Example B1 was repeated, except that surfactant B1 was changed to surfactants B2 to B7 to prepare polymerizable monomer compositions B2 to B7, which were then subjected to the supercritical polymerization step, to thereby obtain polymer particles B2 to B7.

Example B8

The procedure of Example B1 was repeated, except that surfactant B1 was changed to surfactant B8 having the following Structural Formula (product of Croda, "MONASIL PCA") to prepare polymerizable monomer composition B8, which was then subjected to the supercritical polymerization step, to thereby obtain polymer particles B8.

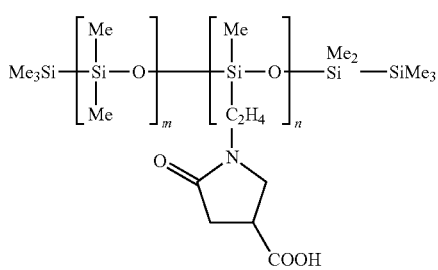

Comparative Example B1

(1) Preparation of Addition Polymerizable Monomer Composition

Styrene monomer (product of Wako Pure Chemical Industries, Ltd.) (20 parts by mass) and surfactant B8 (5 parts by mass) were stirred together to prepare a homogeneous polymerizable monomer composition B9.

(2) Supercritical Polymerization Step

The above-prepared polymerizable monomer composition B9 (20 parts by mass) was charged into a pressure-resistant cell (in an amount of 20% by volume of the pressure-resistant cell). Carbon dioxide was selected as a supercritical fluid and supplied into the above reaction cell with a supply bomb. The pressure and the temperature were adjusted to 30 MPa and 65° C. with a pressure pump and a temperature controller.

In addition, 2,2'-azobisisobutylonitrile (AIBN) (product of Wako Pure Chemical Industries, Ltd.) (1 part by mass) was added thereto as a polymerization initiator, followed by reaction for 40 hours.

After completion of reaction, the temperature was decreased to 5° C. while the pressure was being maintained. The pressure pump and the back pressure valve were used to adjust the flow rate at the outlet of the back pressure valve to 5.0 L/min. Then, supercritical carbon dioxide was allowed to flow for 6 hours. After the residual monomers had been removed, the reaction system was gradually returned to normal temperature and normal pressure, to thereby obtain polymer particles B9 (yield: 31%). Polymer particles B9 were found to have a number average molecular weight (Mn) of 7,242 and a molecular weight distribution (Mw/Mn) of 7.10.

Comparative Example B2

(1) Preparation of Polymeriable Monomer Composition

Styrene monomer (product of Wako Pure Chemical Industries, Ltd.) was washed with a 5% by mass aqueous sodium hydroxide solution, followed by evaporating under reduced pressure, to thereby obtain purified styrene monomer containing no radical polymerization inhibitor.

The purified styrene monomer was bubbled with nitrogen gas for 15 min while being stirred with a stirrer, to thereby remove oxygen contained in the styrene monomer.

The thus-purified, deoxidized styrene monomer (1,900 parts by mass) was added to high-molecular-weight azo polymerization initiator (product of Wako Pure Chemical Industries, Ltd., VPS-1001) (13 parts by mass). The resultant mixture was stirred with a stirrer at room temperature until the high-molecular-weight azo polymerization initiator (product of Wako Pure Chemical Industries, Ltd., VPS-1001) was dissolved completely, to thereby obtain a styrene solution of the high-molecular-weight azo polymerization initiator.

A high-pressure cell (volume: 10 mL) was blown with nitrogen gas to remove oxygen. The high-pressure cell was charged with azobisisobutylonitrile (product of Wako Pure Chemical Industries, Ltd.) (95 parts by mass) and the styrene solution of the high-molecular-weight azo polymerization initiator (product of Wako Pure Chemical Industries, Ltd., VPS-1001), followed by reaction, to thereby obtain polymerizable monomer composition B10.

(2) Supercritical Polymerization Step

The above-prepared polymerizable monomer composition B10 (40 parts by mass) was charged into a pressure-resistant reaction cell (in an amount of 20% by volume of the pressure-resistant reaction cell). Carbon dioxide was selected as a supercritical fluid and supplied into the above reaction cell with a supply bomb. The pressure and the temperature were adjusted to 40 MPa and 65° C. with a pressure pump and a temperature controller. The reaction was performed for 24 hours to obtain polymer particles B10. After completion of reaction, the high-pressure cell was cooled to room temperature and returned to normal pressure while gradually discharging carbon dioxide, to thereby obtain polymer particles B10 as white powder.

Polymer particles B10 were found to have a number average molecular weight (Mn) of 5,900 and a molecular weight distribution (Mw/Mn) of 2.48.

The measurement results of the obtained polymer particles B10 are shown in Table B1.

TABLE B1

| | Ex. B1 | Ex. B2 | Ex. B3 | Ex. B4 | Ex. B5 | Ex. B6 | Ex. B7 | Ex. B8 | Comp. Ex. B1 | Comp. Ex. B2 |
|---|---|---|---|---|---|---|---|---|---|---|
| Surfactant | 1 | 2 | 3 | 4 | 5 | 6 | 7 | 8 | 9 | — |
| Number average molecular weight (Mn) | 6886 | 6773 | 7031 | 6418 | 6483 | 7211 | 6623 | 34185 | 7241 | 5900 |
| Molecular weight distribution (Mw/Mn) | 1.96 | 1.79 | 1.82 | 1.79 | 1.81 | 1.85 | 1.76 | 1.45 | 7.10 | 2.48 |

The polymer particles of the present invention can be used for various applications such as electrophotographic developers, printing inks, building paints and cosmetics.

What is claimed is:

1. A method for producing polymer particles, comprising:
   (A) polymerizing a ring-opening polymerizable monomer containing an ester bond in the ring, to produce a polymer while granulating the polymer in a compressive fluid with a metal-free organic catalyst in the presence of a surfactant, wherein no metal containing catalyst is present during the polymerizing, wherein the surfactant is a member selected from the group consisting of surfactants having structural formulae (A2), and (A3);

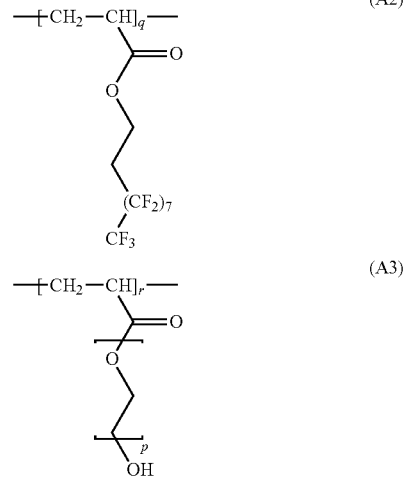

wherein m and n are each an integer indicating number of repeating units and m/n=0.3 to 70; wherein each of q, r, and p are integers indicating number of repeating units.

2. The method according to claim 1, wherein the metal-free organic catalyst is a nucleophilic nitrogen compound having basicity.

3. The method according to claim 1, wherein the metal-free organic catalyst is a cyclic compound containing a nitrogen atom.

4. The method according to claim 1, wherein the metal-free organic catalyst is at least one selected from the group consisting of a cyclic amine compound, a cyclic diamine compound, a cyclic triamine compound having a guanidine skeleton, a heterocyclic aromatic organic compound containing a nitrogen atom and N-heterocyclic carbene.

5. The method according to claim 4, wherein the metal-free organic catalyst is any one selected from the group consisting of 1,4-diazabicyclo-[2.2.2]octane, 1,8-diazabicyclo[5.4.0]undec-7-ene, 1,5,7-triazabicyclo[4.4.0]dec-5-ene, diphenylguanidine, N,N-dimethyl-4-aminopyridine, 4-pyrrolidinopyridine and 1,3-di-tert-butylimidazol-2-ylidene.

6. The method according to claim 1, wherein the ring-opening polymerizable monomer is a lactide of L-form lactic acids, a lactide of D-form lactic acids, or a lactide of an L-form lactic acid and a D-form lactic acid.

7. The method according to claim 1, wherein the surfactant used in (A) has compatibility to both the compressive fluid and the ring-opening polymerizable monomer.

8. The method according to claim 1, wherein the surfactant used in (A) contains any one selected from the group consisting of a perfluoroalkyl group, a polydimethylsiloxane group and a polyacrylate group.

9. The method according to claim 1, wherein the compressive fluid is formed of carbon dioxide.

10. Polymer particles obtained by a method comprising:
(A) polymerizing a ring-opening polymerizable monomer containing an ester bond in the ring, to produce a polymer while granulating the polymer in a compressive fluid with a metal-free organic catalyst in the presence of a surfactant, wherein no metal containing catalyst is present during the polymerizing,
wherein the surfactant is a member selected from the group consisting of surfactants having structural formulae (A2), and (A3);

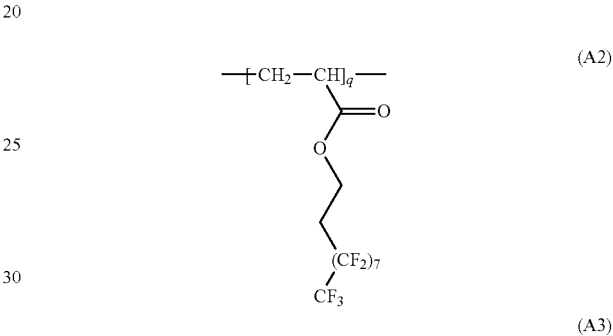

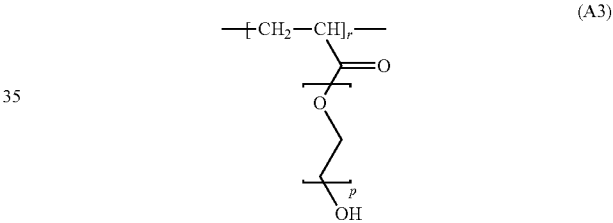

wherein m and n are each an integer indicating number of repeating units and m/n=0.3 to 70; wherein each of q, r, and p are integers indicating number of repeating units.

11. The polymer particles according to claim 10, wherein the polymer particles have a molecular weight distribution Mw/Mn of 2.0 or less, where Mw denotes a weight average molecular weight of the polymer particles and Mn denotes a number average molecular weight of the polymer particles.

* * * * *